United States Patent
Ciocca et al.

(10) Patent No.: US 6,517,936 B1
(45) Date of Patent: Feb. 11, 2003

(54) MULTI-LAYER STRETCH FILM

(75) Inventors: Paolo Ciocca, Novara (IT); Roberto Forloni, Di Nerviano (IT); Isabella Ferri, San Lazzaro (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/555,330

(22) PCT Filed: Dec. 22, 1998

(86) PCT No.: PCT/EP98/08399

§ 371 (c)(1),
(2), (4) Date: Sep. 25, 2000

(87) PCT Pub. No.: WO99/33650

PCT Pub. Date: Jul. 8, 1999

(51) Int. Cl.[7] .......................... B32B 27/08; B32B 27/32
(52) U.S. Cl. ...................... 428/349; 428/516; 428/517; 428/518; 428/519
(58) Field of Search ................ 428/35.7, 34.9, 428/36.7, 349, 516, 517, 518, 519

(56) References Cited

U.S. PATENT DOCUMENTS

| 4,619,859 A | | 10/1986 | Yoshimura et al. ......... 428/213 |
| 4,910,085 A | * | 3/1990 | Raniere et al. ............. 428/412 |
| 5,085,927 A | | 2/1992 | Dohrer ....................... 428/220 |
| 5,445,893 A | | 8/1995 | Mueller et al. ............. 428/500 |
| 5,486,387 A | | 1/1996 | Mueller ..................... 428/34.7 |
| 6,027,776 A | * | 2/2000 | Mueller ..................... 428/35.2 |

FOREIGN PATENT DOCUMENTS

FR    2 705 053    5/1993

* cited by examiner

Primary Examiner—Sandra M. Nolan
(74) Attorney, Agent, or Firm—Thomas C. Lagaly

(57) ABSTRACT

A stretch film heat-sealable to polystyrene-based material comprising a first outer heat-sealing layer, a second outer layer and at least an intermediate layer, comprising in the first outer heat-sealing layer a TPE-S such as a styrene-butadiene-styrene block terpolymer (SBS) or a hydrogenated derivative thereof. Also described are packages made with the new stretch film.

11 Claims, 1 Drawing Sheet

MULTI-LAYER STRETCH FILM

The present invention relates to a multi-layer stretch film which can be heat-sealed to polystyrene material.

Stretch films are by definition thermoplastic films that, when applied under tension around a product, elongate and conform to the product.

Stretch films are actually used in the packaging of a substantial number of products including foodstuffs, such as cheese, processed meat, poultry, fruit, vegetable, fish, pizza. etc. These products are currently sold in packages consisting of a base, such as a flat support or preferably a tray, on which the product to be packaged is placed, overwrapped with a stretch film, e.g. stretch PVC or stretch polyolefin films.

Stretch overwrapping is generally carried out using either a horizontal stretch wrapper or an elevator-type stretch wrapper.

In the horizontal stretch wrapper the film is pre-stretched and applied over the product while kept under tension by a suitable grip system. The film is then folded longitudinally around the base supporting the product and sealed longitudinally below said base by means of a centre-sealer. The film tubing is then longitudinally severed and the front and rear flaps thus obtained are folded and welded against the tubing surface by passing the package on a heated belt.

In the elevator-type stretch wrapper, the film is kept tensioned and stretched by raising the product placed on the suitable base against the film. Then the film is folded, both transversely and longitudinally, around the base supporting the product and bunch-sealed against the lower surface of said base by passing the package on a heated belt.

Depending on the type of film employed, passing on a heated belt may be insufficient to close the package by tack welding. In such a case, a pressure-assisted welding step is necessary, wherein a driven overhead pressure roller operates in conjunction with the heated belt.

In any case the tightness of the package closure will vary depending on the welding sealing and cold-/hot-tack) properties of the film.

Depending on the type of material used for the base and for the stretch film or the sealing layer thereof, the welding step may lead to a more-or-less strong bond between the stretch film flaps and between the stretch film and the base. A high bond between the film flaps and a high sticking of the film to the tray would clearly be preferred as the risk of leaking of liquids (i.e. purge) from the package to contaminate the outside of the same package and/or of the other packages that are stored close to it, would thus be reduced.

A new method of packaging using a stretch film has recently been described in co-pending International Patent Application PCT/EP97/3640 filed by the same applicant, the content of which is incorporated herein by reference.

Briefly, said new method provides placing the product to be packaged on the upper surface of a support, such as a flat sheet or a tray, stretching a thermoplastic stretch film over the product, and welding the thermoplastic stretched film to the support all around the product or to the tray flanges so as to form with said support a hermetically sealed enclosure for the product. By this new method the amount of packaging material required is highly reduced, the end package is hermetically sealed with no problems of purge leaks and/or contamination, and the appearance of the package is much more appealing. While in said new method welding can be obtained by any means, welding by heat-sealing is preferred.

Therefore when bases of polystyrene (PS) or foamed or expanded polystyrene (EPS) are employed, what is very common in these food packaging applications, a stretch film that can be heat-sealed to polystyrene is required. While there are many commercially available stretch films with good elastic, optical and mechanical properties, none of these films can be heat-sealed to a polystyrene based surface. On the other hand films that might be heat-sealed to polystyrene-based materials, such as polystyrene films, do not have sufficiently good elastic properties for use as stretch films in these types of packaging applications.

It would therefore be highly desirable to have a stretch film provided with good mechanical, elastic, and optical properties that could also seal to a polystyrene or foamed polystyrene base. Such a film could suitably be employed both in the conventional overwrapping packaging methods and in the new method described in co-pending International Patent Application PCT/EP97/3640 to provide improved packages.

There are a number of properties a stretch film needs to have:

good elastic properties, i.e. good elongation, high elastic recovery and low permanent deformation;

good optics, i.e. low haze and high gloss;

good mechanical properties, in particular good puncture resistance and high abuse resistance;

good sealability to the support material, particularly when used in accordance with the packaging method described in co-pending International Patent Application PCT/EP97/3640;

and, when used in conventional stretch overwrapping, also high cold- and hot-tack properties.

A first object of the present invention is therefore to provide a stretch film with good elastic, optical and mechanical properties that is heat-sealable to polystyrene or polystyrene-based materials.

A second object of the present invention is a stretch overwrapped package wherein the overwrapping stretch film is a film of the invention.

A third object of the present invention is a hermetically sealed package comprising a base of polystyrene-based material, a product to be packaged supported on the upper surface of said base, and a stretch thermoplastic film according to the present invention extending over the product and welded, all around the product, to the base so as to form therewith a hermetically sealed enclosure for the product.

DEFINITIONS

Figure 1:
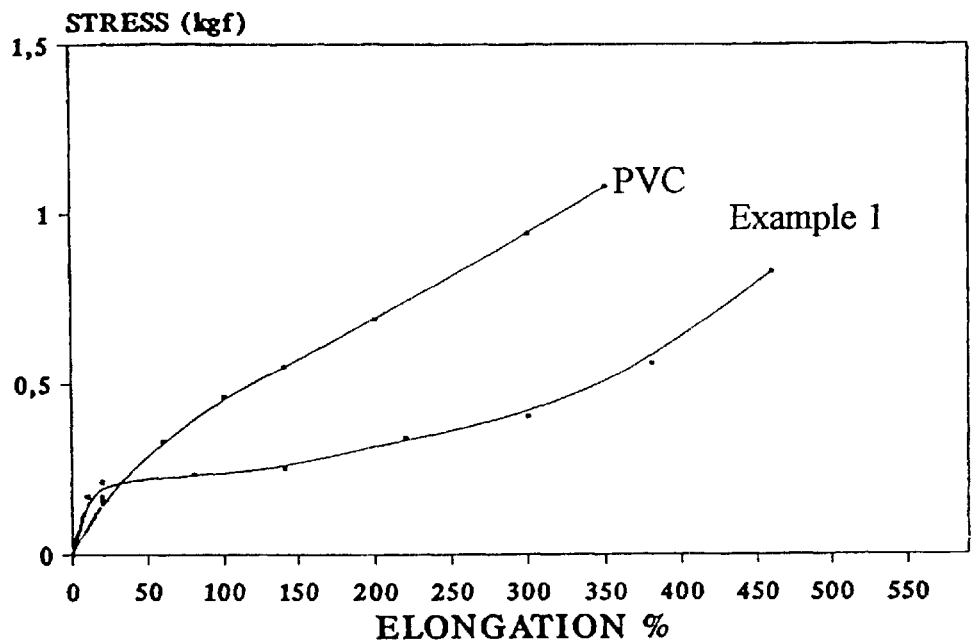
FIGS. 1 and 2 show graphic comparisons of the elongation properties of the film of Example 1 to those of PVC.

As used herein in connection with a multilayer film, the phrase "outer layer" refers to any layer having less than two of its principal surfaces directly adhered to another layer of the structure; the phrases "intermediate layer" or "inner layer" refer to any layer having both of its principal surfaces directly adhered to another layer of the structure.

As used herein, the phrases "heat-sealable layer" and "heat-sealing layer" refer to the outer layer of the stretch film that is involved in the heat-sealing of the stretch film to itself or to the base. Heating can be performed by any one or more of a wide variety of manners, such as using heated bar(s), hot wires, hot knives, hot air, infrared radiation, ultrasonic sealing, radio or high frequency radiation, etc., as appropriate.

As used herein the term "stretch film" refers to a film that can be stretched at room temperature (cold stretched) under the conditions of ASTM D-882 (Method A) by at least 150% of its original length without breaking, by applying a stretching force not higher than 2 kg/cm.

As used herein TPE, i.e. thermoplastic elastomer, is any of a family of polymers that resemble elastomers in that they are highly resilient and can be repeatedly stretched to at least twice their initial lengths with full rapid recovery, but are true thermoplastics and thus do not require curing or vulcanisation.

As used herein TPE-S is a TPE based on styrene block copolymer (SBC), i.e. a linear or branched (star-shaped) block copolymer comprising styrene. Examples of TPE-S are styrene-butadiene-styrene block terpolymer (SBS), styrene-ethylene/butene-styrene block terpolymer (SEBS), and styrene-isoprene-styrene block terpolymer (SIS). Also included within this group are the hydrogenated derivatives thereof.

As used herein, the term "polyolefin" refers to any polymerised olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Included are homogeneous and heterogeneous polymers. Specific examples include polyethylene homopolymer, polypropylene homopolymer, polybutene, ethylene-α-olefin copolymer, propylene-α-olefin copolymer, butene-α-olefin copolymer, ethylene-vinyl acetate copolymer, ethylene-ethyl acrylate copolymer, ethylene-butyl acrylate copolymer, ethylene-methyl acrylate copolymer, ethylene-acrylic acid copolymer, ethylene-methacrylic acid copolymer, modified polyolefin resin, ionomer resin, polymethylpentene, etc.

As used herein, the phrase "heterogeneous polymer" refers to polymerisation reaction products of relatively wide variation in molecular weight and relatively wide variation in composition distribution.

As used herein, the phrase "homogeneous polymer" refers to polymerisation reaction products of relatively narrow molecular weight distribution and relatively narrow composition distribution.

As used herein, the phrase "ethylene-α-olefin copolymer," is inclusive of a diverse group of polyethylene copolymers. More specifically, this phrase encompasses such heterogeneous materials as linear low density polyethylene (LLDPE), very low and ultra low density polyethylene (VLDPE and ULDPE), as well as homogeneous polymers such as metallocene-catalysed EXACT™ and EXCEED™ linear homogeneous ethylene-α-olefin copolymer resins obtainable from the Exxon Chemical Company, metallocene-catalysed ENGAGE™ and ELITE™ linear homogeneous ethylene-α-olefin copolymer resins obtainable from the Dow Chemical Company, and TAFMER™ linear homogeneous ethylene-α-olefin copolymer resins obtainable from the Mitsui Petrochemical Corporation. Other ethylene-α-olefin copolymers, such as long chain branched homogeneous ethylene-α-olefin copolymers available from The Dow Chemical Company, known as AFFINITY™ resins, are also included as another type of homogeneous ethylene-α-olefin copolymer.

As used herein the phrase "over the product" refers to the position of a package component which is over the product when the product or the tray containing it is in an upright position.

DETAILED DESCRIPTION OF THE INVENTION

The multi-layer stretch film according to the present invention comprises at least a first outer heat-sealing layer, a second outer layer and an intermediate layer, and is characterised in that the first outer heat-sealing layer comprises a TPE-S.

As indicated above there are different types of TPE-S and any of these polymers or blends thereof can be used in the first outer heat-sealing layer.

In a preferred embodiment however the first outer heat-sealing layer will comprise SBS polymers or their hydrogenated derivatives.

Suitable SBS block copolymers can be prepared by the processes described i.a. in BE-A-824,226, GB-A-2,138,009, and WO-A-9535335.

Particularly preferred are those SBS block copolymers comprising 1 to 40% by volume of a hard phase-forming polystyrene block with a Tg higher than 25° C. and 99 to 60% by volume of a soft phase-forming styrene-butadiene block copolymer with a Tg lower than 25° C.

Examples of suitable polymers are e.g. Stiroflex™ BX6104 by BASF and Tuftec™ H 1052 or H1041 by Asahi Chemical Industry.

The TPE-S can be used as such in the first outer heat-sealing layer of the stretch film of the present invention or can be blended with other compatible resins, as known in the art. When a blend of a TPE-S with other compatible resins is employed, the TPE-S is typically employed in a major proportion, e.g. at least 60, preferably at least 75 and most preferably at least 90% by weight of the overall weight of the layer.

In a preferred embodiment however the first outer heat-sealing layer of the films according to the present invention will essentially comprise one or more TPE-S.

These TPE-S used for the first outer heat-sealing layer may contain the conventional additives known in the art such as anti-fog agents, UV absorbers, pigments, antioxidants, stabilisers, etc.. Part of these additives are generally blended into the TPE-S directly at the resin manufacturer plant, e.g. antioxidants and stabilisers, while others, e.g. anti-fog agents, pigments, UV-absorbers, etc., may be added, depending on the end use of the film, in the form of a masterbatch, i.e. a concentrate of the additives in the same resin or in another resin compatible with the TPE-S resin, before extrusion.

In the film according to the present invention the first outer heat-sealing layer preferably amounts to at least 25% by weight of the weight of the overall structure, more preferably to at least 35% by weight, and even more preferably to at least 45% by weight.

The first outer heat-sealing layer of the films according to the present invention can be heat-sealed to any surface comprising polystyrene and/or styrene-based co- or terpolymers, as well as to any surface of foamed polystyrene or styrene-based co- or terpolymers.

The film according to the present invention contains at least 3 layers.

The additional layers should serve the purpose of providing the necessary bulk to the stretch film and improving its mechanical properties, i.e. increased puncture resistance, increased abuse resistance, etc., and that of avoiding sticking of the film to the sealing bars. These purposes should be achieved without impairing, and preferably improving, the elastic properties of the overall structure.

The second outer layer therefore generally needs to have heat-resistant properties, to avoid sticking of the film to the sealing bars. Resin or resins used for said second outer heat-resistant layer are preferably selected from the polyolefin group and more particularly from the group consisting of ethylene-vinyl acetate copolymers, ethylene-acrylic acid copolymers, ethylene-methacrylic acid copolymers, ethylene-α-olefin copolymers, either homogeneous or heterogeneous, low density polyethylene, and blends of these polymers. When, according to a preferred embodiment of the present invention, the second outer layer comprises a polymer selected from ethylene-vinyl acetate copolymers and either homogeneous or heterogeneous ethylene-α-olefin copolymers with a density $\leq 0.915$ g/cm$^3$, the film will also have the desired cold- and hot-tack properties for use in the conventional overwrapping packaging methods.

Alternatively, when the film needs to be lap-sealed, the second outer layer may suitably comprise a TPE-S.

When a film according to the present invention with a second outer layer comprising a TPE-S is used in a process providing for a heat-sealing step, in order to control the problem of sticking of said second outer layer to the sealing jaws or to itself when rolled up, the amount of mineral additives such as silica, silicates, mineral fillers, that are contained in said second outer layer, may be much higher than that conventionally employed. In particular % by weight up to about 5, preferably up to about 4, may well be employed to prevent sticking without impairing the film optics. Anyway, in such a case, sealing conditions, e.g. temperature of the sealing bars or of the heated belt, sealing time, and pressure used in the sealing step, should suitably be set to avoid sticking problems.

The composition of the intermediate layer is generally such as to improve the elastic properties of the film. Generally it will comprise polymers with a low modulus. Preferably the modulus of the intermediate layer will be up to about 5,000 kg/cm$^2$, more preferably up to about 4,000 kg/cm$^2$, and even more preferably up to about 3,000 kg/cm$^2$.

It may comprise e.g. polyolefin thermoplastic elastomers (TPE-O) e.g. the Exact™ grades from the Exxon Chemical Company and the Engage™ polyolefins from The Dow Chemical Company, polybutene, olefinic elastomers such as ethylene-propylene elastomers (EPM) or ethylene-propylene-diene elastomers (EPDM) wherein the conjugated diene may be for example 1,4-hexadiene, dicyclopentadiene or ethylidene norbornene, elastomers such as polyisobutylenes (PIB), isobutylene-isoprene rubbers (IIR) and halogenated derivatives thereof, blends of these olefinic elastomers with an ethylene homo- or co-polymer, ethylene-vinyl acetate copolymers, preferably with a high vinyl acetate content, thermoplastic polyurethanes (TPE-U), and the like resins.

Also, there may be more than one intermediate layer. When two or more intermediate layers are present they may have the same or a different composition.

If the selection of the resins or resin blends for the intermediate layer(s) does not allow to obtain a sufficient bond between the various layers of the structure, intermediate tie layers having as their primary scope that of improving the bond will be used.

Resins suitable for use in the tie layers depend on the layers whose bond should be improved. Typically tie layers will comprise ethylene-vinyl acetate copolymers or ethylene-α-olefin copolymers optionally modified with carboxylic acid or anhydride groups.

Generally stretch films do not need to have gas barrier properties. On the contrary a high gas permeability is in some instances preferred (e.g. in the packaging of breathing food products such as vegetables, cheese and the like products). However, when gas barrier properties are desired, the stretch film of the present invention may contain an intermediate layer comprising plasticised PVDC to impart to the film the desired gas barrier properties.

Preferably the thickness of the stretch film will be less than 50 μm. Typically, the stretch films to be used in the package and in the method of packaging according to the present invention have a thickness of from about 8 to about 30 μm and preferably of from about 10 to about 25 μm.

Preferred stretch films according to the present invention are those than can be cold stretched by at least 180% of their original length without breaking, by applying a stretching force not higher than 2 kg/cm.

More preferred stretch films according to the present invention are those than can be cold stretched by at least 180% of their original length without breaking, by applying a stretching force not higher than 1.5 kg/cm.

Furthermore, preferred stretch films are those coupling a high elongation with a low permanent deformation.

A film with a low permanent deformation is a film that can recover its original (planar) state after being stretched, such as by the deforming force of a finger that depresses it. A film with a low permanent deformation will more easily maintain its original aesthetically attractive appearance even after handling abuse.

In particular, preferred stretch films are those films showing a permanent deformation lower than 15%, and even more preferred are those showing a permanent deformation lower than 10%.

These stretch films may be manufactured by the blown film (or hot blown film) process wherein a multi-layer tube is formed and then, while it is still molten, is blown up like a bubble to generate a large diameter tube from a relatively small circular die.

Alternatively, and preferably, these stretch films are manufactured by cast co-extrusion or extrusion coating, using either a flat or a circular film die that allows to shape the polymer melt into a thin film or tube.

Flat cast co-extrusion is however the most preferred method.

The invention is illustrated by the following examples, which are provided for the purpose of representation, and are not to be construed as limiting the scope of the invention. Unless stated otherwise, all percentages disclosed above are based on weight. Melt Index (MI) is measured according to ASTM D-1238, Condition E, at 190° C. and is reported as grams per 10 minutes.

EXAMPLES 1 to 4

Three layer films with a first outer heat sealant layer (7 μm thick) of styrene-butadiene-styrene block copolymer (Stiroflex™ BX6104 by BASF), a second outer layer (4 μm thick) of a heterogeneous ethylene-α-olefin copolymer with a density of 0.911 g/cm$^3$ and a MI of about 6 g/10' (Stamylex™ 08-076F by DSM), and an intermediate layer A (4 μm thick) as indicated in following Table I, are obtained by hot blown. A 15-cm diameter circular die was employed with a blow-up ratio (ratio of final to initial tube diameter) of about 4.5:1.

TABLE 1

| Example no. | Intermediate layer A |
| --- | --- |
| 1 | EVA, 14 wt. % VA and MI 0.4 g/10' (Evatane ™ 1003VN4 by ELF-ATOCHEM) |
| 2 | EVA, 18 wt. % VA and MI 2 g/10' (Evatane ™ 1020VN5 by ELF-ATOCHEM) |
| 3 | Polybutylene, MI 2 g/10' (Polybutylene 0200 by SHELL) |
| 4 | EVA, 28 wt. % VA and MI 4 g/10' (Evatane ™ 2803 by ELF-ATOCHEM) |

EXAMPLES 5 to 7

Three layer films with a first outer heat sealant layer (8 μm thick) of styrene-butadiene-styrene block copolymer (Stiroflex™ BX6104 by BASF), a second outer layer (3 μm thick) of a heterogeneous ethylene-α-olefin copolymer with a density of 0.911 g/cm³ and a MI of about 6 g/10' (Stamylex™ 08-076F by DSM) containing 0.3% of erucamide and 0.09% of silica, and an intermediate layer A (6 μm thick) as indicated in following Table II, are obtained by hot blown.

TABLE II

| Example no. | Intermediate layer A |
|---|---|
| 5 | EVA, 28 wt.% VA and MI 4 g/10' (Evatane ™ 2803 by ELF-ATOCHEM) |
| 6 | Ethylene-propylene co-polymer (EPR) (Catalloy EXPE2226M by MONTELL) |
| 7 | 93.3% EVA, 18 wt. % VA and MI 2 g/10' (Evatane ™ 1020VN5 by ELF-ATOCHEM) 4% of glycerol mono- and di-oleate 2% polyoxyethylene ethers with ($C_{12}$–$C_{14}$) fatty alcohols 0.7% silica |

EXAMPLES 8 and 9

Three layer films with a first outer heat sealant layer (8 μm thick) of styrene-butadiene-styrene block copolymer (Stiroflex™ BX6104 by BASF), a second outer layer (3 μm thick) of an ethylene-α-olefin copolymer with a density of 0.911 g/cm³ and a MI of about 6 g/10' (Stamylex™ 08-076F by DSM) containing 0.3% of erucamide and 0.09% of silica, and an intermediate layer A (4 μm thick) as indicated in following able III, are obtained by flat cast co-extrusion.

TABLE III

| Example no. | Intermediate layer A |
|---|---|
| 8 | EVA, 18 wt. % VA and MI 2 g/10' (Evatane ™ 1025VN5 by ELF-ATOCHEM) |
| 9 | Polyurethane with MI 22.4 g/10' (Estane ™ 58271 by BF Goodrich) |

EXAMPLE 10

The film of Example 10 is obtained by following the same procedure of Example 8 but using, as the second outer layer, instead of a heterogeneous ethylene-α-olefin copolymer, a blend of 85% of a homogeneous ethylene-α-olefin copolymer with a density of 0.902 g/cm³ and a MI of about 1.0 g/10' (Affinity™ PL1880 by DOW) with 15% of a masterbatch in the same polymer containing 3% of erucamide and 0.9% of silica.

EXAMPLE 11

The film of Example 11 is obtained by following the procedure of the foregoing example but replacing the EVA used in the intermediate layer with ethylene-propylene co-polymer (EPR) (Catalloy EXPE2226M by MONTELL).

EXAMPLE 12

The film of Example 12 is obtained by following the procedure of Example 10 but replacing the homogeneous ethylene-α-olefin copolymer with the heterogeneous ethylene-α-olefin copolymer of Examples 1 to 4.

EXAMPLES 13 to 16

Three layer films are obtained by hot-blown with a first outer heat sealant layer (8 μm thick) of styrene-butadiene-styrene block copolymer (Stiroflex™ BX6104 by BASF) containing 0.3% or erucamide and 0.03% of silica, a second outer layer (3 μm thick) of a heterogeneous ethylene-α-olefin copolymer with a density of 0.911 g/cm³ and a MI of about 6 g/10' (Stamylex™ 08-076F by DSM) containing 0.3% of erucamide and 0.09% of silica, and an intermediate layer A (4 μm thick) as indicated in following Table IV

TABLE IV

| Example no. | Intermediate layer A |
|---|---|
| 13 | EVA, 18 wt. % VA and MI 2 g/10' (Evatane ™ 1020VN5 by ELF-ATOCHEM) |
| 14 | EBA copolymer, 17 wt. % BA and MI 4 g/10' (NCPE-6440 by BOREALIS) |
| 15 | SBS (Stiroflex ™ BX6104 by BASF) |
| 16 | Ethylene-propylene co-polymer (Dutral ™ C0034 PL by Enichem) |

EXAMPLE 17

The film of Example 17 is obtained by following the same procedure of Example 15 but replacing the polymer used in the the second outer layer with a styrene-butadiene-styrene block copolymer (Stiroflex™ BX6104 by BASF) containing 0.3% of erucamide and 0.03% of silica. The obtained film with both outer layers of SBS can be easily lap-sealed.

EXAMPLE 18

A four layer film is obtained by hot blown with a first outer heat sealant layer (8.5 μm thick) of a blend of 60 wt. % of styrene-butadiene-styrene block copolymer (Stiroflex™ BX6104 by BASF) and 40 wt. % of a masterbatch containing 4% of glycerol mono- and di-oleate and 2% of polyoxyethylene ethers with ($C_{12}$–$C_{14}$) fatty alcohols (antifog composition) in the same SBS resin, a second outer layer (3 μm thick) of a heterogeneous ethylene-α-olefin copolymer with a density of 0.911 g/cm³ and a MI of about 6 g/10' (Stamylex™ 08-076F by DSM) containing 0.3% of erucamide and 0.09% of silica, an intermediate layer A (1.5 μm thick) having the composition of the first heat-sealing outer layer and another intermediate layer B (3 μm thick) in-between the above intermediate layer A and the first outer heat-sealing layer, said intermediate layer B being of EVA, 18 wt. % VA and MI 2 g/10' (Evatane™ 1025VN5 by ELF-ATOCHEM).

EXAMPLE 19

A five layer film is obtained by hot blown having the general structure H/A/B/A/O wherein H is a first outer heat-sealing layer (7 μm thick) of styrene-butadiene-styrene block copolymer (StiroflexTM BX6104 by BASF), O is the second outer layer (3 μm thick) of a heterogeneous ethylene-α-olefin copolymer with a density of 0.911 g/cm³ and a MI of about 6 g/10' (Stamylex™ 08-076F by DSM) containing 0.3% of erucamide and 0.09% of silica, A are two intermediate layers (each 1.5 μm thick) of Evatane™ 1025VN5 containing 4% of glycerol mono- and di-oleate and 2% of polyoxyethylene ethers with ($C_{12}$–$C_{14}$) fatty alcohols, and B is another intermediate layer (3 μm thick) of ethylene-propylene co-polymer (EPR) (Catalloy EXPE 2226 M by MONTELL).

EXAMPLE 20

A five layer film having the general structure H/A'/B'/A'/O, wherein H and O are as defined in Example 19, the intermediate layers A (each 1 μm thick) are of EVA, 18 wt. % VA and MI 2 g/10' (Evatane™ 1025VN5 by ELF-ATOCHEM) and the intermediate layer B (2 μm thick) is of polyurethane with MI 22.4 g/10' (Estane™ 58271 by B F Goodrich), is obtained by flat cast co-extrusion.

The elastic, mechanical and optical properties of representative films according to the present invention have been evaluated and the results are reported in following Tables V and VI.

In particular the elastic properties have been expressed in terms of % elongation at break (Table V), and permanent deformation (Table VI); the mechanical properties have been assessed by the puncture resistance test (Table V); and the optical properties by the evaluation of haze and gloss of the films (Table V).

These tests have been carried out as indicated hereinbelow:

% Elongation at break: the percent extension required to break a specimen of the film has been measured by standard method ASTM D 882.

Permanent deformation: permanent deformation of the stretched films has been measured by means of a device consisting of a) a metallic frame holding a specimen of the stretched film and positioned as the top lid of a transparent cell; b) a metallic rod perpendicular to the metallic frame and whose round tip is laid on the center of the film specimen, said rod being free to move vertically inside a graduated transparent cylinder positioned over the metallic frame; c) means for blowing compressed air into the cell below the frame and means for removing said compressed air.

The test has been carried out by positioning a specimen of the film, stretched by 15 % in each direction (longitudinal and transversal), in the frame; assembling the frame on top of the cell and then the graduated cylinder with the inner free moving metallic rod on top of the frame; reading the initial position of the round tip (in contact with the film) in the graduated cylinder; slowly blowing compressed air into the cell until the film specimen reaches a position 15 mm higher than the initial one; let air escape from the cell; and 1 minute later read the position of the round tip of the metallic rod.

The difference, in mm, between the original position and the final position of the film (measured by referring to the position of the round tip of the metallic rod in the graduated cylinder) represents the stretched film permanent deformation.

The weight of the metallic rod was 3.7 g and the diameter of the round tip was about 1 cm, while the frame dimensions were 20 cm×20 cm.

Table VI also reports the % permanent deformation, simply calculated by multiplying the permanent deformation (in mm) by 100/15, and the maximum deformation (in mm), i.e. the height reached by the round tip of the metallic bar upon blowing compressed air into the cell, immediately before breakage of the film.

Puncture resistance: the puncture resistance is the resistance force arising when pushing a punch against a surface of flexible film.

There is no standard test method to measure this attribute.

The test method used in the present evaluations is described briefly herein below: a film sample (65 mm×65 mm) is fixed in a specimen holder connected to a compression cell (1–50 kg normal sensitivity) mounted on a dynamometer (an Instron tensile tester); when the dynamometer is started, a punch (a punching sphere, 5-mm in diameter, soldered on a plunger) is brought against the film sample at a constant speed (300 mm/min.) and the force needed to puncture the sample is graphically recorded. Puncture resistance is expressed in grams.

Haze: haze is defined as the percentage of transmitted light which in passing through the specimen deviates from the incident beam by forward scattering, and is measured by ASTM D 1003 (Procedure A).

Gloss: the specular gloss of the films, i.e. the relative luminous reflectance factor of a specimen in the mirror direction has been measured using ASTM 2457-90 with a gloss angle of 60°.

TABLE V

| Film of Example no. | % Elongation L | % Elongation T | Haze | Gloss | Puncture Resistance |
|---|---|---|---|---|---|
| 1 | 454 | 492 | 3.4 | 130 | — |
| 2 | 461 | 460 | 2.6 | 140 | — |
| 3 | 428 | 490 | 2.3 | 141 | — |
| 4 | 473 | 536 | 2 | 138 | — |
| 5 | 446 | 510 | — | — | 914 |
| 6 | 449 | 558 | — | — | 1035 |
| 7 | 461 | 528 | — | — | — |
| 8 | 266 | 577 | 1.4 | 174 | 713 |
| 9 | 273 | 519 | 1.9 | 128 | 599 |
| 10 | 334 | 510 | 2.4 | 140 | 699 |
| 11 | 273 | 525 | 2.8 | 137 | 778 |
| 12 | 230 | 532 | 2.2 | 122 | 628 |
| 13 | 334 | 462 | 4.4 | 127 | 409 |
| 17 | 445 | 509 | 3.1 | 139 | — |
| 18 | 533 | 568 | — | — | — |
| 19 | 369 | 525 | — | — | 593 |
| 20 | 338 | 524 | 2.1 | 137 | 732 |

TABLE VI

| Film of Example no. | Permanent deformation (mm) | % permanent deformation | Max Deformation (mm) |
|---|---|---|---|
| 1 | 1.7 | 11 | 30 |
| 2 | 0.7 | 5 | 31 |
| 3 | 2.3 | 15 | 28 |
| 4 | 1.3 | 9 | 32 |
| 5 | 0.0 | 0 | 31 |
| 6 | 0.7 | 5 | 28 |
| 7 | 0.5 | 3 | 30 |
| 8 | 0.7 | 5 | 28 |
| 9 | 1.0 | 7 | 31 |
| 10 | 0.0 | 0 | 32 |
| 11 | 0.7 | 5 | 30 |
| 12 | 1.8 | 12 | 29 |
| 13 | 0.3 | 2 | 28 |
| 17 | 2.0 | 13 | 34 |
| 18 | 1.7 | 11 | 32 |
| 19 | 1.3 | 9 | 26 |
| 20 | 0.3 | 2 | 30 |
| Comp.FilmA | 3.0 | 20 | 33 |

Comparative Film A is a mono-layer, 15 μm-thick, film of a styrene-butadiene-styrene block copolymer (Stiroflex™ BX6104 by BASF). As it can be realized from the results reported in the table above, the mono-layer film has a good stretchability which however is not coupled with an acceptable permanent deformation.

Figure 2:
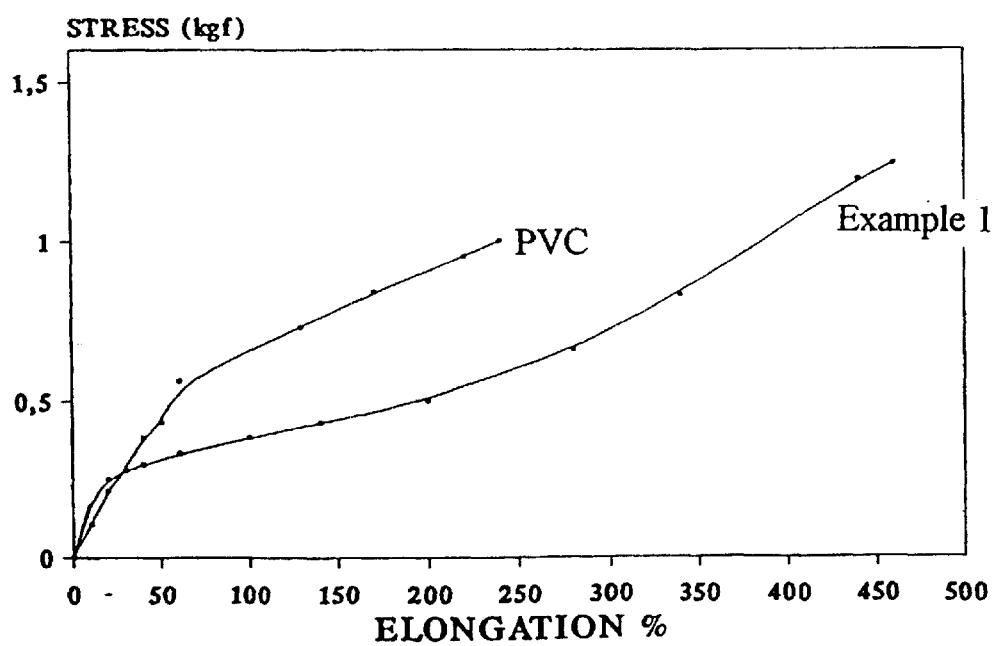

Furthermore the stretchability of the film of Example 1 has been evaluated in comparison with PVC. A good indication of the stretchability of a film can be obtained considering the stress versus elongation curves. In FIGS. 1 and 2 there are reported the curves obtained for the film of Example 1 and PVC (normalised for a film thickness of 15 μm). These curves show that the film of Example 1 according to the present invention can be stretched in both the transversal and the longitudinal directions 30–60% more than PVC, applying a much lower force.

An additional test method for the evaluation of the abuse resistance of stretched films has been set up. Said test is particularly suitable for the evaluation of film resistance in case of packaging of objects with sharp edges, such as bones in case of meat packaging. The film was stretched over a tray containing a wood block, higher than the tray walls, with sharp staples laying on its top. A standard elevator-type overwrapping machine, an Automac A55, was used and the abuse resistance was evaluated by the presence of holes and/or tears on the film near the staples. The films of Examples 2 and 10 were tested as representative films of the invention in comparison with PVC and five packs for each stretch film were tested. While with the films of the present invention no tear was observed and only in one out of the five packs (Example 10) or two out of the five packs (Example 2) a small hole was observed over the staple sharp edges, with PVC the pack integrity was drastically impaired as holes over the staple edges and tears initiating therefrom were evident in all the packs.

Sealability of the films of the present invention to polystyrene-based materials has been confirmed by using five trays of EPS (230 mm long, 145 mm wide, and 50 mm high) each one loaded with a whole chicken (1.1 kg). The film of Example 10 was stretched and heat-sealed to the tray rim by means of a heat-sealing frame. The sealing conditions were as follows:

sealing time: 2' sealing temperature: 120° C.

sealing pressure: 5 bar.

Upon visual inspection, the packages resulted to be perfectly sealed. The packages were hold firmly in one hand by keeping them by the tray bottom and side walls, turned upside down and held in this position for at least 1 minute. No peeling of the seals or any other damage to the packages was observed as well as no drip out of the packages.

The Oxygen Transmission Rate ($O_2TR$) and the Carbon dioxide Transmission Rate ($CO_2TR$) of some representative films of the invention have been evaluated versus PVC and found to be comparable therewith. The $O_2TR$ has been evaluated by following ASTM method D-3985 at 23° C. and 0% R.H. A modification of this same method, using an IR detector, has been used for the evaluation of the $CO_2TR$.

What is claimed is:

1. A stretch film comprising a first outer heat-sealing layer, a second outer layer and at least an intermediate layer, wherein the first outer heat-sealing layer consists essentially of a thermoplastic elastomer based on a styrene block copolymer (TPE-S) and said film can be cold stretched by at least 180% of its original length without breaking by applying a stretching force not higher than 2 kg/cm.

2. A stretch film as in claim 1 wherein the first outer heat-sealing layer comprises a TPE-S selected from the group consisting of styrene-butadiene-styrene block terpolymer (SBS), styrene-ethylene/butene-styrene block terpolymer (SEBS), styrene-isoprene-styrene block terpolymer (SIS) and the hydrogenated derivatives thereof.

3. A stretch film as in claim 2 wherein the first outer heat-sealing layer comprises a styrene-butadiene-styrene block terpolymer (SBS) or a hydrogenated derivative thereof.

4. A stretch film as in claim 1 wherein the second outer layer comprises a polyolefin.

5. A stretch film as in claim 4 wherein the second outer layer comprises a polymer selected from ethylene-vinyl acetate copolymers, ethylene-acrylic acid copolymers, ethylene-methacrylic acid copolymers, ethylene-α-olefin copolymers, either homogeneous or heterogeneous, low density polyethylene, and blends of these polymers.

6. A stretch film as in claim 1 wherein the second outer layer comprises a TPE-S.

7. A stretch film as in claim 6 wherein said second outer layer comprises a TPE-S containing up to 5 wt. % of mineral additives.

8. A stretch film as in claim 1 wherein the intermediate layer has a modulus up to about 5,000 kg/cm$^2$.

9. A stretch film as in claim 8 wherein the intermediate layer comprises at least one material selected from ethylene-α-olefin thermoplastic elastomers, polybutene, ethylene-propylene elastomers (EPM), ethylene-propylene-diene elastomers (EPDM) wherein the conjugated diene may be 1,4-hexadiene, dicyclopentadiene or ethylidene norbornene, polyisobutylenes (PIB), isobutylene-isoprene rubbers (IIR) and the halogenated derivatives thereof, blends of these elastomers with an ethylene homo- or co-polymer, ethylene-vinyl acetate copolymers with a high vinyl acetate content, and thermoplastic polyurethanes.

10. A stretch film as in claim 1 characterized in that it can be cold stretched by at least 180% of its original length without breaking, by applying a stretching force not higher than 1.5 kg/cm.

11. A stretch film as in claim 1 characterized by a permanent deformation lower than 15%.

* * * * *